United States Patent

[11] 3,589,763

| [72] | Inventor | John Vincent Reeves |
| | | Stoke, Coventry, England |
| [21] | Appl. No. | 789,257 |
| [22] | Filed | Jan. 6, 1969 |
| [45] | Patented | June 29, 1971 |
| [73] | Assignee | Rootes Motors Limited |
| | | London, England |
| [32] | Priority | Jan. 5, 1968 |
| [33] | | Great Britain |
| [31] | | 914/68 |

[54] SEATS
3 Claims, 9 Drawing Figs.

| [52] | U.S. Cl. | 297/452 |
| [51] | Int. Cl. | A47c 7/16 |
| [50] | Field of Search | 297/452, 458, 455, 441, 445 |

[56] References Cited

UNITED STATES PATENTS

| 2,275,908 | 3/1942 | Kelly | 297/441 |
| 2,836,833 | 6/1958 | Carlson | 297/458 |
| 3,088,773 | 5/1963 | Horrocks | 297/445 |

FOREIGN PATENTS

| 274,484 | 7/1951 | Switzerland | 297/441 |
| 795,950 | 6/1958 | Great Britain | 297/441 |

Primary Examiner—Reinaldo P. Machado
Attorney—Mawhinney & Mawhinney

ABSTRACT: A seat having front and rear crossmembers between which a resilient diaphragm is stretched for supporting a seat cushion and a resilient connecting member secured to the underside of the diaphragm part way between the front and rear crossmembers and to the seat frame below the front and rear crossmembers which connecting member is arranged to hold the diaphragm in a generally concave formation.

PATENTED JUN 29 1971  3,589,763
SHEET 1 OF 2
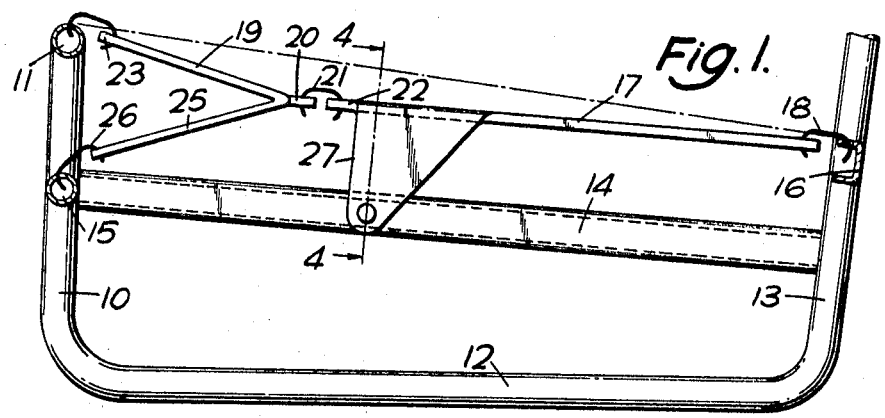
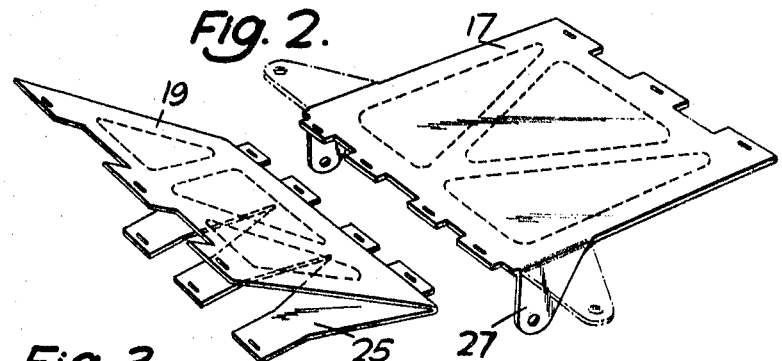
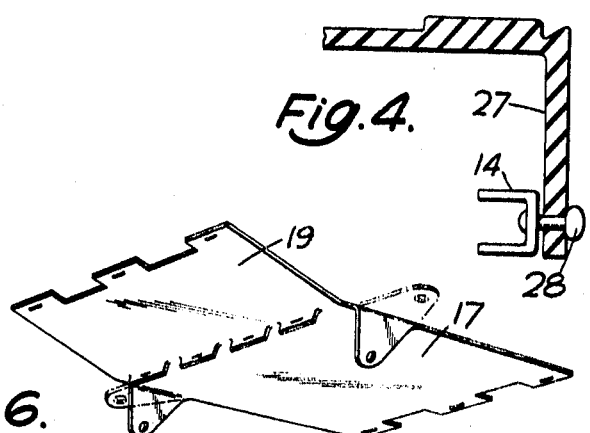
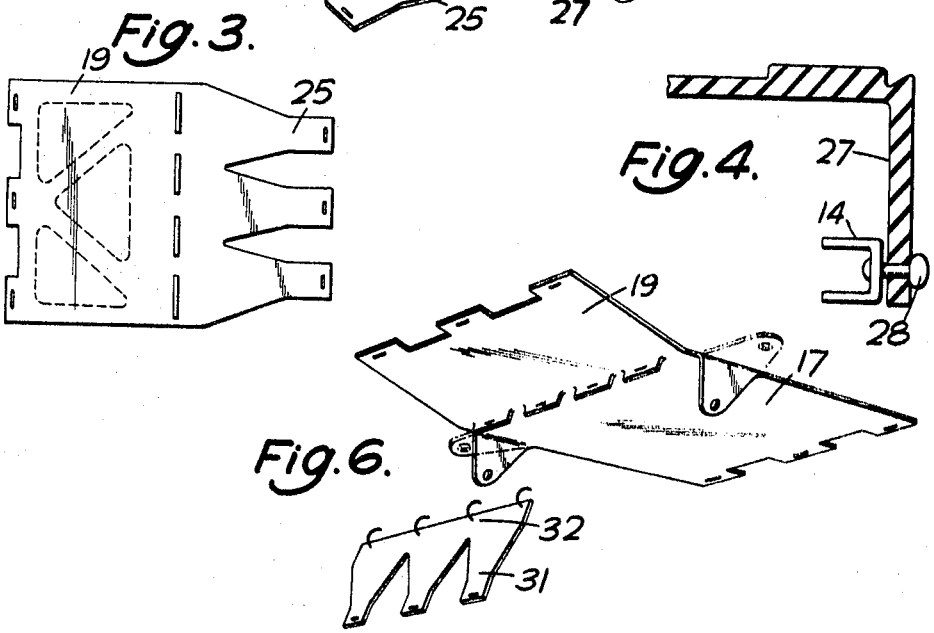
INVENTOR
JOHN VINCENT REEVES
BY mawhinney & mawhinney
ATTYS.

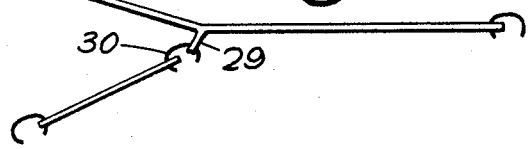
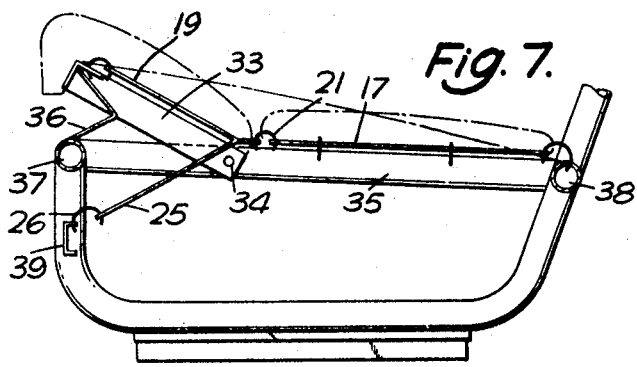
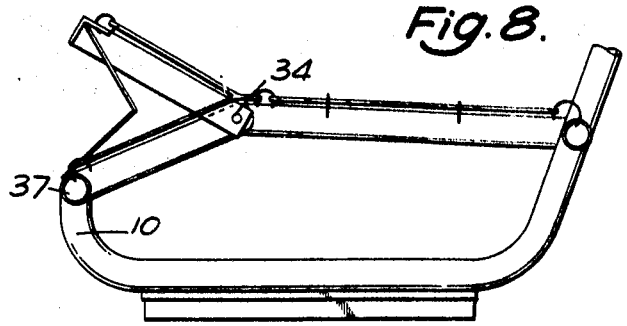
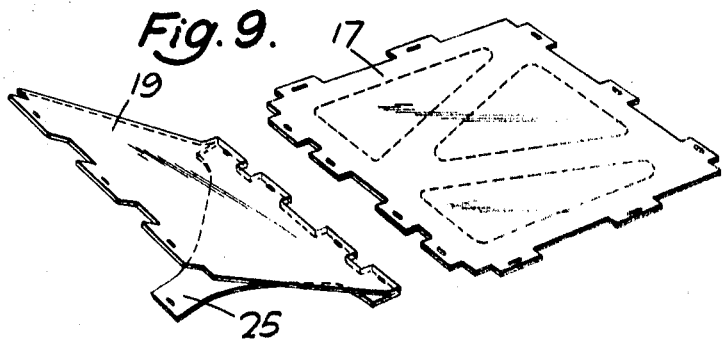

SEATS

This invention relates to seats and is particularly although not exclusively applicable to seats for motor vehicles.

The invention provides a seat comprising a seat frame having front and rear crossmembers between which a resilient diaphragm for supporting a seat cushion is stretched characterized in that there is provided a connecting member extending between the underside of the diaphragm at a location between the front and rear crossmembers and a part of the seat frame located below the diaphragm, so that the diaphragm is held by the member in a generally concave formation.

The seat frame may have a further front crossmember located below the first mentioned front crossmember to which said connecting member is attached.

The connecting member may be a resilient member.

For example the connecting member may be a resilient panel.

The diaphragm may be a single continuous resilient panel having means on the underside thereof for attachment to said connecting member.

The means on the underside of the panel may comprise an integrally formed lug or lugs for attachment to said member.

Alternatively the resilient diaphragm may comprise front and rear resilient panels secured together at the location where the connecting member meets the diaphragm.

A front panel and a connecting member may be formed integrally with one another.

In any of the arrangements referred to above the first-mentioned front crossmember of the seat frame may comprise an intermediate section of a U-shaped member the free ends of the limbs of which are pivotally mounted on side members of the seat frame about an axis extending transversely of the seat at or near the location where the connecting member is secured to the diaphragm and spring means acting between the U-shaped member and a fixed part of the seat frame support the U-shaped member in an upwardly inclined attitude so that the intermediate section of the member is normally located above said axis.

In any of the arrangements referred to above the seat may have side members located in a plane below the front and rear crossmembers and the resilient diaphragm has downwardly extending lugs on either side thereof secured to said side members.

The following is a description of a number of embodiments of the invention reference being made to the accompanying drawings, in which:

FIG. 1 is a side view of a seat;

FIG. 2 is an exploded perspective view of a resilient support for the seat;

FIG. 3 is a plan view of a part of the resilient support shown in FIG. 2;

FIG. 4 is a section on the line 4—4 of FIG. 1;

FIG. 5 is a side view of an alternative form of resilient support to that shown in the seat in FIG. 1;

FIG. 6 is an exploded perspective view of the resilient support shown in FIG. 5;

FIG. 7 is a side view of an alternative seat frame construction to that shown in FIG. 1;

FIG. 8 shows a further form of seat construction; and

FIG. 9 is an exploded perspective view of a further form of resilient support.

Referring now to FIG. 1 there is shown a seat frame which comprises two spaced upright members 10 only one of which can be seen connected together by a crossmember 11. The lower ends of the members 10 are connected by side members 12, only one of which is shown to the lower ends of two further upright members 13 connected together at their upper ends by a member (not shown). The members 10 and 11 form the front of the seat and the members 13 which are longer than the members 10 form the back of the seat. Further side members 14 are secured part way up the members 10 and to the members 13. A further crossmember 15 is secured to the members 10 adjacent the side members 14. The members 13 are connected together by an intermediate crossmember 16 at a level below that of the member 12 at the front of the seat frame.

A resilient diaphragm comprising front and rear panels 19 and 17 is stretched between the crossmembers 11 and 16. The panel 17 is secured along its rearward edge to the crossmember 16 by hooks 18 and along its forward edge the panel has lugs 22 which are secured by hooks 21 to lugs 20 formed along the rearward edge of panel 19. The forward edge of the panel 19 is formed with lugs 23 which are connected by hooks 24 to the crossmember 11. Three resilient tongues 25 are formed integrally with the front panel 17 at its rearward edge which tongues are connected by hooks 26 to the crossmember 15. The tongues are of such length that the panels 17, 19 are held in the generally concave manner illustrated in FIG. 1. Integrally formed with the panel 17 on either side thereof are ears 27 which are secured by clips 28 (see FIG. 4) to the side members 14 of the frame.

A suitable shaped cushion is secured to the resilient diaphragm and the whole is covered with a suitable plastics or leather in known manner. The uprights 13 of the seat which support the seat squab are also upholstered in known manner.

An alternative form of resilient diaphragm is illustrated in FIGS. 5 and 6 in which panels 17 and 20 are formed integrally with one another and are provided on the underside thereof downwardly extending lugs 29 which are connected by hooks 30 to a panel 32 formed with a number of tongues 31 for attachment by hooks to the crossmember 15.

In a further construction shown in FIG. 7 the seat frame has at the front thereof a U-shaped member 33 the intermediate limb of which forms the front crossmember and the free ends of which are pivotally mounted at 34 to side members 35 of the seat frame. Resilient springs 36 are arranged between the intermediate limb and a lower fixed crossmember 37 of the seat which extends between the side member 35 of the frame. The aforesaid resilient support is secured on the seat in the following manner.

The panel 17 is secured both to a rear crossmember 38 and to the side members 35 and is also connected by hooks 21 to the panel 19 which in turn is secured by hooks to the intermediate limb at the front of the frame. The resilient panel 25 is secured by hooks 26 to a further crossmember 39 extending across the front of the frame below the member 37.

In the arrangement shown in FIG. 8 the seat frame differs from the arrangement shown in FIG. 7 in that the side members are inclined downwardly in front of the pivot mountings 34 and the upright members 10 are shorter and are connected by a single crossmember 37 to which the panel 25 is attached and against which the springs 36 act.

The resilient support shown in FIG. 9 is an alternative form to that shown in FIG. 2 in which the panel 25 is provided with only a single tongue for connection to the crossmember 15 of the frame.

I claim:

1. A seat comprising a seat frame having front and rear crossmembers spaced apart in a generally horizontal plane, a resilient diaphragm for supporting a seat cushion stretched between and secured to the front and rear crossmembers of the frame, the diaphragm comprising front and rear portions which are joined together part-way between the front and rear crossmembers of the frame and which portions extend obliquely to one another to define an upwardly facing concave surface for receiving the seat cushion, and a resilient connection stretched from the join between the front and rear portions of the diaphragm to a part of the frame located below the front crossmember to hold the portion of the diaphragm oblique to one another.

2. A seat as claimed in claim 1 wherein the front and rear portions of the resilient diaphragm are integral with one another.

3. A seat as claimed in claim 1 wherein the front portion of the diaphragm and the resilient connection are integral with one another.